US012145514B1

(12) United States Patent
Moore

(10) Patent No.: US 12,145,514 B1
(45) Date of Patent: Nov. 19, 2024

(54) LADDER RACK ASSEMBLY

(71) Applicant: Kevin Moore, Philomath, OR (US)

(72) Inventor: Kevin Moore, Philomath, OR (US)

( * ) Notice: Subject to any disclaimer, the term of this patent is extended or adjusted under 35 U.S.C. 154(b) by 301 days.

(21) Appl. No.: 17/508,409

(22) Filed: Oct. 22, 2021

(51) Int. Cl.
B60R 11/06 (2006.01)
E06C 5/00 (2006.01)
B60R 9/042 (2006.01)

(52) U.S. Cl.
CPC .............. *B60R 11/06* (2013.01); *E06C 5/00* (2013.01); *B60R 9/0423* (2013.01); *B60Y 2200/14* (2013.01)

(58) Field of Classification Search
CPC ..... B60R 11/06; B60R 9/0423; B60R 9/0485; B60R 9/00; B60R 9/04; B60R 9/048; E06C 5/00; B60P 7/15
USPC ....... 224/309, 405, 315, 320, 319, 321, 323, 224/324, 325, 42.37, 42.38, 552, 567
See application file for complete search history.

(56) References Cited

U.S. PATENT DOCUMENTS

| 5,127,564 | A * | 7/1992 | Romero | .................... B60R 9/00 224/570 |
| 8,925,776 | B2 * | 1/2015 | Moore | .................... B60R 9/048 224/325 |
| 10,018,208 | B2 * | 7/2018 | Hollis | ..................... F16B 2/065 |
| 2003/0071098 | A1 * | 4/2003 | Martin | ..................... B60R 9/00 224/558 |
| 2010/0133867 | A1 * | 6/2010 | Draisbach | ................. B60P 7/15 296/24.3 |
| 2011/0024472 | A1 * | 2/2011 | Thompson | ............. B60R 9/042 224/310 |
| 2013/0334267 | A1 * | 12/2013 | Sautter, Jr. | ............... B60R 9/04 224/324 |
| 2019/0077328 | A1 * | 3/2019 | Mickley | .................. B60P 7/135 |
| 2020/0391665 | A1 * | 12/2020 | Schroll | ................... B60R 9/058 |

* cited by examiner

*Primary Examiner* — Corey N Skurdal
(74) *Attorney, Agent, or Firm* — BOOTH UDALL FULLER, PLC

(57) ABSTRACT

A ladder rack assembly with a first rack member, a second rack member, and a threaded bolt. The first rack member has a first bracket and a first crossbar coupled to the first bracket, and the second rack member has a second bracket and a second crossbar coupled to the second bracket. The first crossbar and the second crossbar are slidably coupled to each other. The threaded bolt extends through the first crossbar and the second crossbar and is threadedly coupled to a nut. When the threaded bolt is rotated in a clockwise direction, the nut moves along the threaded bolt in a first direction, and when the threaded bolt is rotated in a counterclockwise direction, the nut moves along the threaded bolt in a second direction. The first bracket, the second bracket, and the threaded bolt are configured to retain an object during transport.

5 Claims, 7 Drawing Sheets

LADDER RACK ASSEMBLY

TECHNICAL FIELD

Aspects of this document relate generally to a ladder rack assembly, and more specifically to a ladder rack configured to facilitate secure attachment of a ladder to a vehicle.

BACKGROUND

Pick-up trucks are generally well-suited to transport objects, but when the object exceeds the dimensions of the truck bed, safe transport becomes more of a concern. This can be especially true of lengthy objects, such as ladders, lumber, or poles. Many choose to prop the object up onto the cab of the truck, but this can lead to damage to the cab. In addition, the object may easily slide side-to-side when it is propped up on the cab, even when it is tied down.

SUMMARY

Aspects of this document relate to a ladder rack assembly comprising a first rack member having a first bracket and a first crossbar coupled to a bottom of the first bracket, wherein the first bracket is C-shaped and opens in a first direction and the first crossbar extends away from the first bracket in the first direction, a second rack member having a second bracket and a second crossbar coupled to a bottom of the second bracket, wherein the second bracket is C-shaped and opens in a second direction opposite the first direction, the second crossbar extends away from the second bracket in the second direction, and the second crossbar is telescopically coupled with the first crossbar, a threaded bolt extending through the first crossbar and the second crossbar and threadedly coupled to a nut slidably coupled with the first crossbar, an adjustment lever fixedly coupled to the threaded bolt and configured to rotate the threaded bolt in a clockwise direction and a counterclockwise direction opposite the clockwise direction, wherein when the threaded bolt is rotated in the clockwise direction, the nut moves along the threaded bolt toward the adjustment lever until contacting a stop fixedly coupled to the first crossbar and when the threaded bolt is rotated in the counterclockwise direction, the nut moves along the threaded bolt away from the adjustment lever, and at least one rack foot hingedly coupled to one of the first rack member and the second rack member, the at least one rack foot having a rubber base configured to rest on a surface of a vehicle without damaging the surface of the vehicle, wherein the first rack member, the second rack member, and the threaded bolt together are configured to retain an object during transport.

Particular embodiments may comprise one or more of the following features. The ladder rack assembly may further comprise a knob rotatably coupled to the adjustment lever, wherein the knob is configured to facilitate rotation of the threaded bolt. Each of the first bracket and the second bracket may be sized and shaped to fit around a side rail of a ladder. A maximum distance between the first bracket and the second bracket may be 21 inches. A minimum distance between the first bracket and the second bracket may be 16.5 inches.

Aspects of this document relate to a ladder rack assembly comprising a first rack member having a first bracket and a first crossbar coupled to a bottom of the first bracket, wherein the first crossbar extends away from the first bracket in a first direction, a second rack member having a second bracket and a second crossbar coupled to a bottom of the second bracket, wherein the second crossbar extends away from the second bracket in a second direction opposite the first direction, and the second crossbar is slidably coupled with the first crossbar, a threaded bolt extending through the first crossbar and the second crossbar and threadedly coupled to a nut slidably coupled with the first crossbar, wherein when the threaded bolt is rotated in a clockwise direction, the nut moves along the threaded bolt in the first direction and when the threaded bolt is rotated in a counterclockwise direction opposite the clockwise direction, the nut moves along the threaded bolt in the second direction, and at least one rack foot hingedly coupled to one of the first rack member and the second rack member, the at least one rack foot configured to rest on a surface of a vehicle without damaging the surface of the vehicle, wherein the first rack member, the second rack member, and the threaded bolt together are configured to retain an object during transport.

Particular embodiments may comprise one or more of the following features. The first bracket may be C-shaped and may open in the first direction, and the second bracket may be C-shaped and may open in the second direction. The at least one rack foot may have a rubber base to protect the surface of the vehicle. The ladder rack assembly may further comprise an adjustment lever rotatably coupled to the second rack member, fixedly coupled to the threaded bolt, and configured to rotate the threaded bolt. Each of the first bracket and the second bracket may be sized and shaped to fit around a side rail of a ladder.

Aspects of this document relate to a ladder rack assembly comprising a first rack member having a first bracket and a first crossbar coupled to a bottom of the first bracket, wherein the first crossbar extends away from the first bracket in a first direction, a second rack member having a second bracket and a second crossbar coupled to a bottom of the second bracket, wherein the second crossbar extends away from the second bracket in a second direction opposite the first direction and is coupled with the first crossbar, and a threaded bolt coupled to the first rack member and to the second rack member, wherein a distance between the first bracket and the second bracket is adjustable by rotating the threaded bolt, wherein the first rack member, the second rack member, and the threaded bolt together are configured to retain an object during transport.

Particular embodiments may comprise one or more of the following features. The threaded bolt may extend through the first crossbar and the second crossbar. The ladder rack assembly may further comprise at least one rack foot hingedly coupled to one of the first rack member and the second rack member, the at least one rack foot configured to rest on a surface of a vehicle without damaging the surface of the vehicle. The at least one rack foot may have a rubber base to protect the surface of the vehicle. When the threaded bolt is rotated in a clockwise direction, the first bracket and the second bracket may be drawn closer together, and when the threaded bolt is rotated in a counterclockwise direction opposite the clockwise direction, the first bracket and the second bracket may be pushed further apart. Each of the first bracket and the second bracket may be sized and shaped to fit around a side rail of a ladder. A maximum distance between the first bracket and the second bracket may be 21 inches and a minimum distance between the first bracket and the second bracket may be 16.5 inches. The first bracket may be C-shaped and open in the first direction, and the second bracket may be C-shaped and open in the second direction. The second crossbar may be telescopically coupled with the first crossbar. The ladder rack assembly may further comprise an adjustment lever rotatably coupled to the second rack member, fixedly coupled to the threaded bolt, and configured to rotate the threaded bolt.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
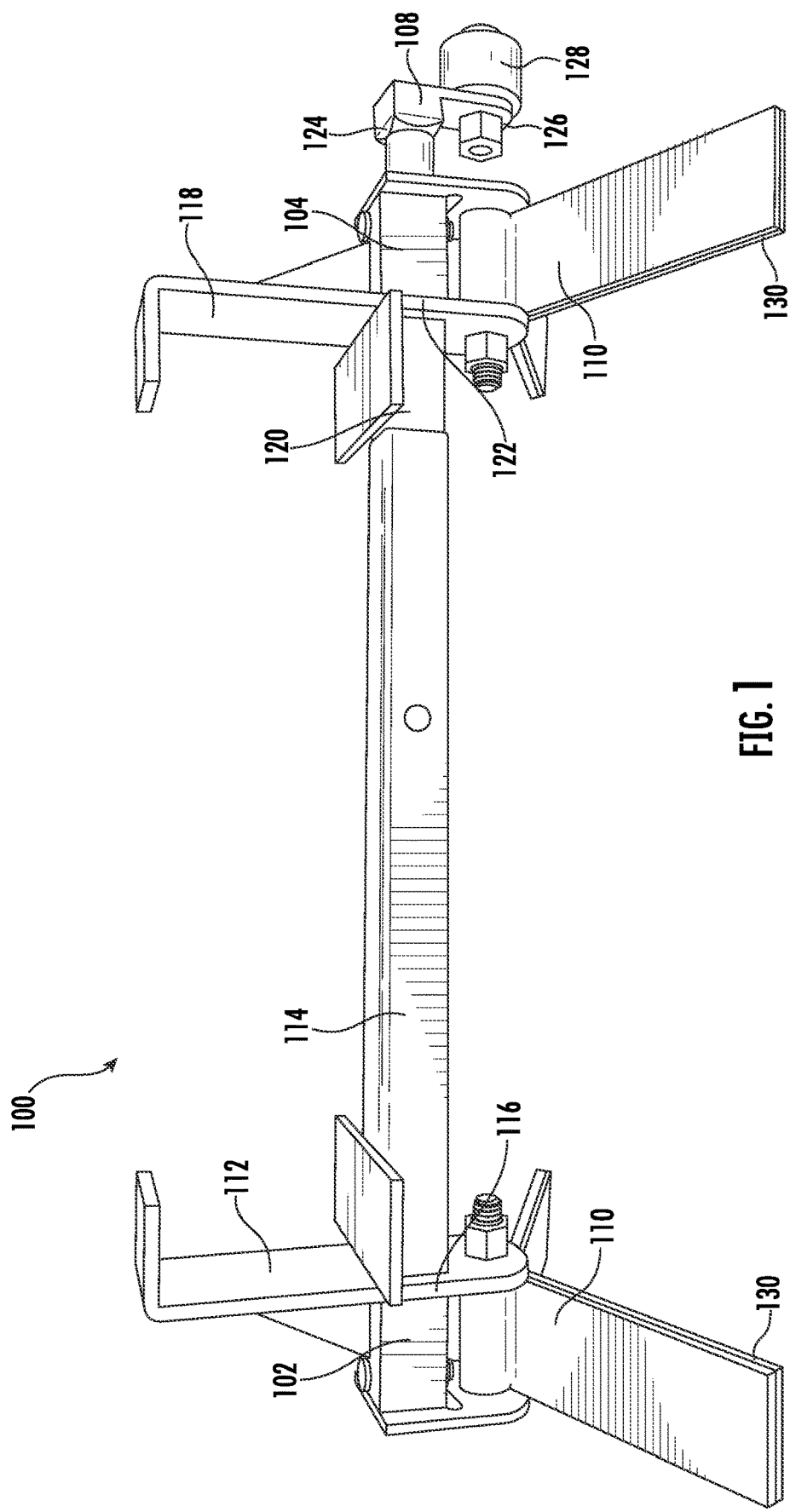
FIG. 1 is a perspective view of a ladder rack assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure is related to a ladder rack assembly 100 configured to facilitate securing a ladder 10 or other long object in a truck bed. The ladder rack assembly 100 grips the ladder 10 and protects the truck from damage by acting as an intermediate layer between the ladder 10 and the truck. For example, once the ladder 10 is coupled to the ladder rack assembly 100, the ladder rack assembly 100 may be placed on top of the cab of the truck. The ladder 10 can then be secured within the truck bed, extending over the cab of the truck without coming into contact with the cab.

Figure 2:
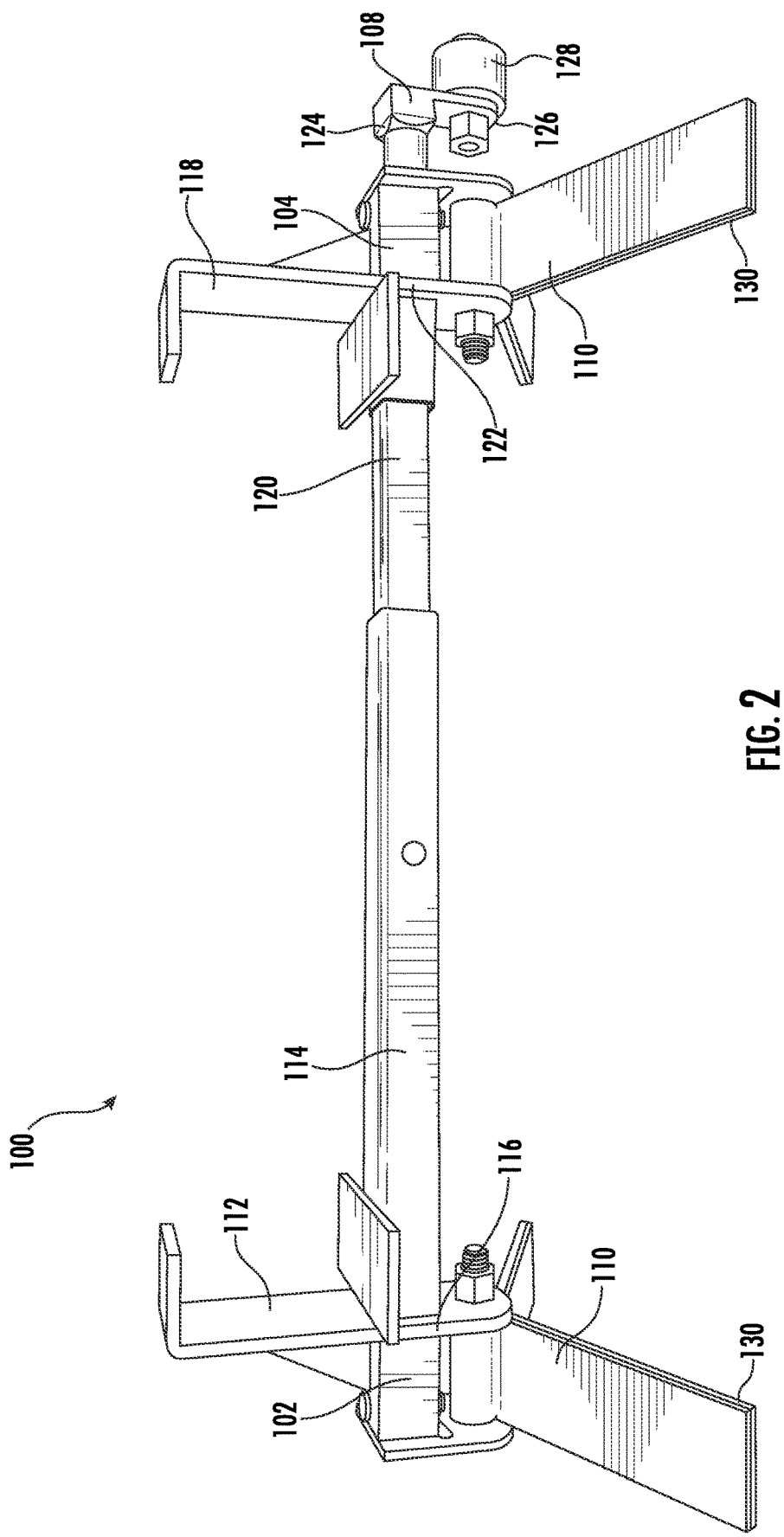
FIG. 2 is a perspective view of the ladder rack assembly shown in FIG. 1, where the distance between the first rack member and the second rack member has been adjusted.
Figure 3:
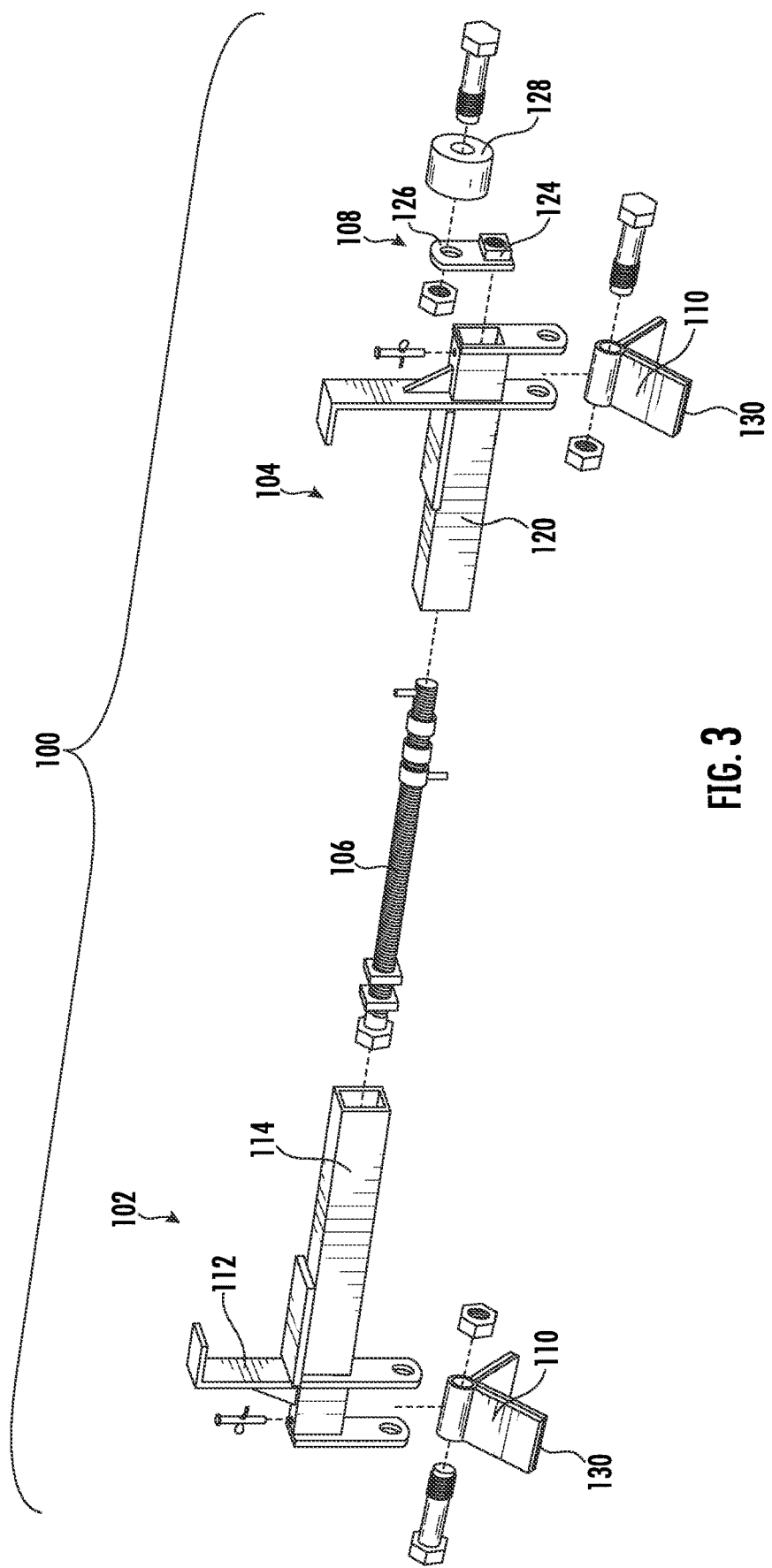
FIG. 3 is an exploded view of the ladder rack assembly shown in FIG. 1.

As shown in FIGS. 1-7, the ladder rack assembly 100 may comprise a first rack member 102, a second rack member 104, and a threaded bolt 106. The ladder rack assembly 100 may also comprise an adjustment lever 108 and at least one rack foot 110. The first rack member 102 has a first bracket 112 and a first crossbar 114. The first crossbar 114 may be coupled to a bottom 116 of the first bracket 112. In some embodiments, the first bracket 112 is C-shaped, opening in a first direction. However, the first bracket 112 may be any other shape capable of receiving a ladder rail. For example, the first bracket 112 may be U-shaped, L-shaped, or simply a flat plate. Other shapes are also contemplated. The first crossbar 114 may extend away from the first bracket 112 in the first direction. The first crossbar 114 may also extend away from the first bracket 112 in a second direction opposite the first direction. In other words, the first crossbar 114 may extend away from the first bracket 112 in the same direction as the first bracket 112 opens, as shown in FIGS. 1-3. Alternatively, the first crossbar 114 may extend away from the first bracket 112 in the opposite direction from the direction the first bracket 112 opens.

The second rack member 104 has a second bracket 118 and a second crossbar 120. The second crossbar 120 may be coupled to a bottom 122 of the second bracket 118. In some embodiments, the second bracket 118 is C-shaped, opening in the second direction opposite the first direction. However, similar to the first bracket 112, the second bracket 118 may be any other shape capable of receiving a ladder rail. For example, the second bracket 118 may be U-shaped, L-shaped, or simply a flat plate. Other shapes are also contemplated. The second crossbar 120 may extend away from the second bracket 118 in the second direction. The second crossbar 120 may also extend away form the second bracket 118 in the second direction. In other words, the second crossbar 120 may extend away from the second bracket 118 in the same direction as the second bracket 118 opens, as shown in FIGS. 1-3. Alternatively, the second crossbar 120 may extend away from the second bracket 118 in the opposite direction from the direction the second bracket 118 opens. The second crossbar 120 is coupled to the first crossbar 114. The second crossbar 120 and the first crossbar 114 may be telescopically coupled, slidingly coupled, or coupled in some other way.

The threaded bolt 106 extends through the first crossbar 114 and the second crossbar 120, as shown in FIG. 3. The threaded bolt 106 may be threadedly coupled to a nut 107, or a plurality of nuts 107, that is slidably coupled with the first crossbar 114. For example, the nut 107 may be sized and shaped to fit within the first crossbar 114 and slide within the first crossbar 114 in the first direction and in the second direction. The nut 107 may be constrained from rotating freely by the first crossbar 114. This allows the threaded bolt 106 to rotate and move the first rack member 102 and the second rack member 104 closer together and further apart. For example, the ladder rack assembly 100 may be configured so that when the threaded bolt 106 is rotated in a clockwise direction, the nut 107 moves along the threaded bolt 106 toward the adjustment lever 108 or in the first direction, and when the threaded bolt 106 is rotated in a counterclockwise direction opposite the clockwise direction, the nut 107 moves along the threaded bolt 106 away from the adjustment lever 108 or in the second direction. The first crossbar 114 may have a stop 123, as shown in FIG. 3, through which the threaded bolt 106 extends, but that impedes movement of the nut 107 therethrough. Thus, when the nut 107 is moved toward and comes into contact with the stop 123, the nut 107 pulls the first crossbar 114 with the nut 107, and thus draws the first bracket 112 and the second bracket 118 towards each other. When a ladder or another object is located between the first bracket 112 and the second bracket 118, the ladder rack assembly 100 is thus tightened onto that object. Additionally, when the nut 107 is moved away from the stop 123, this loosens the ladder rack assembly 100 and allows the first crossbar 114 to slide with respect to the second crossbar 120, thus allowing the user to quickly release the ladder from the grip of the ladder rack assembly 100.

Figure 4:
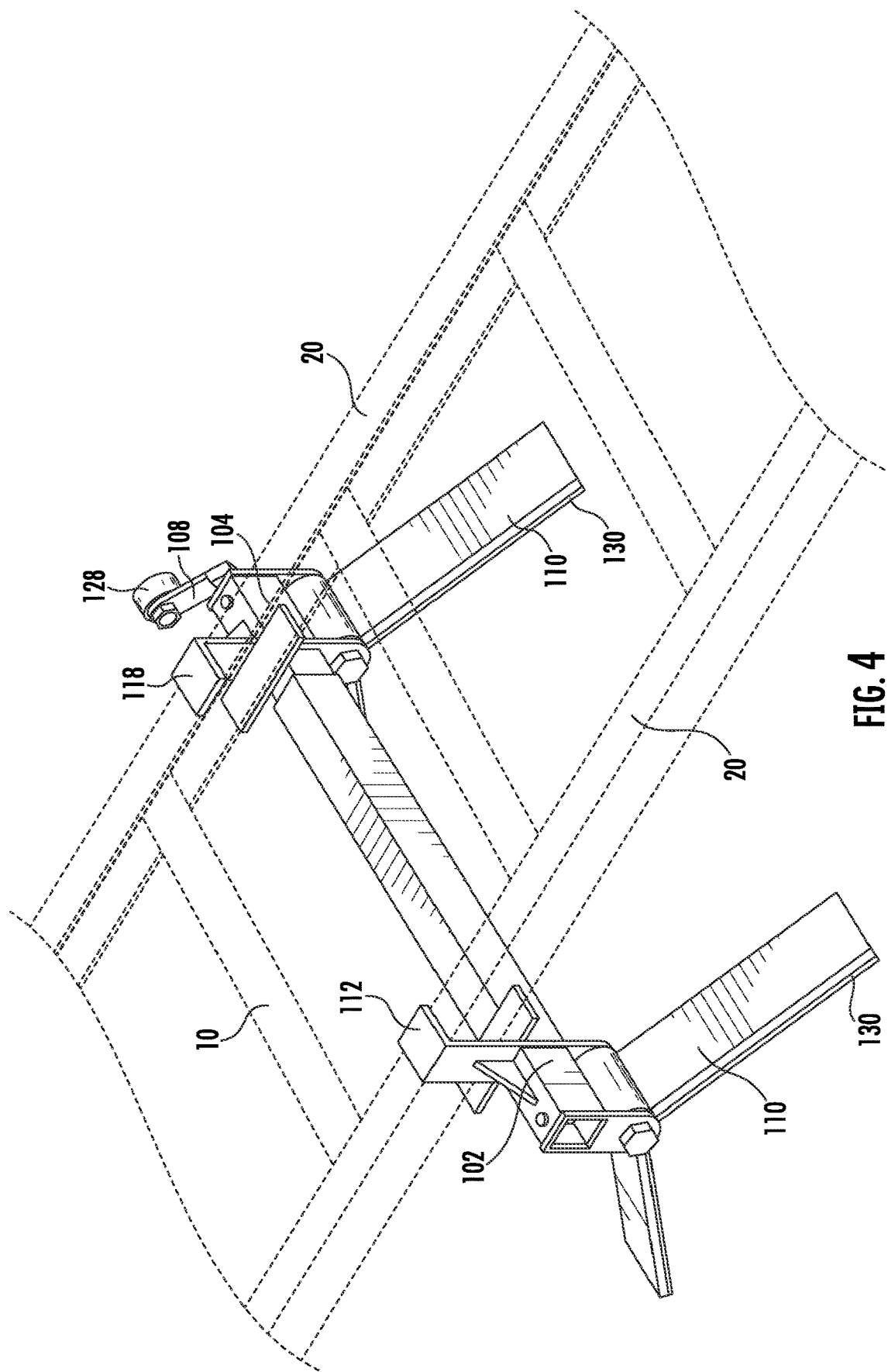
FIG. 4 is perspective view of the ladder rack assembly shown in FIG. 1 gripping a ladder.
Figure 5:
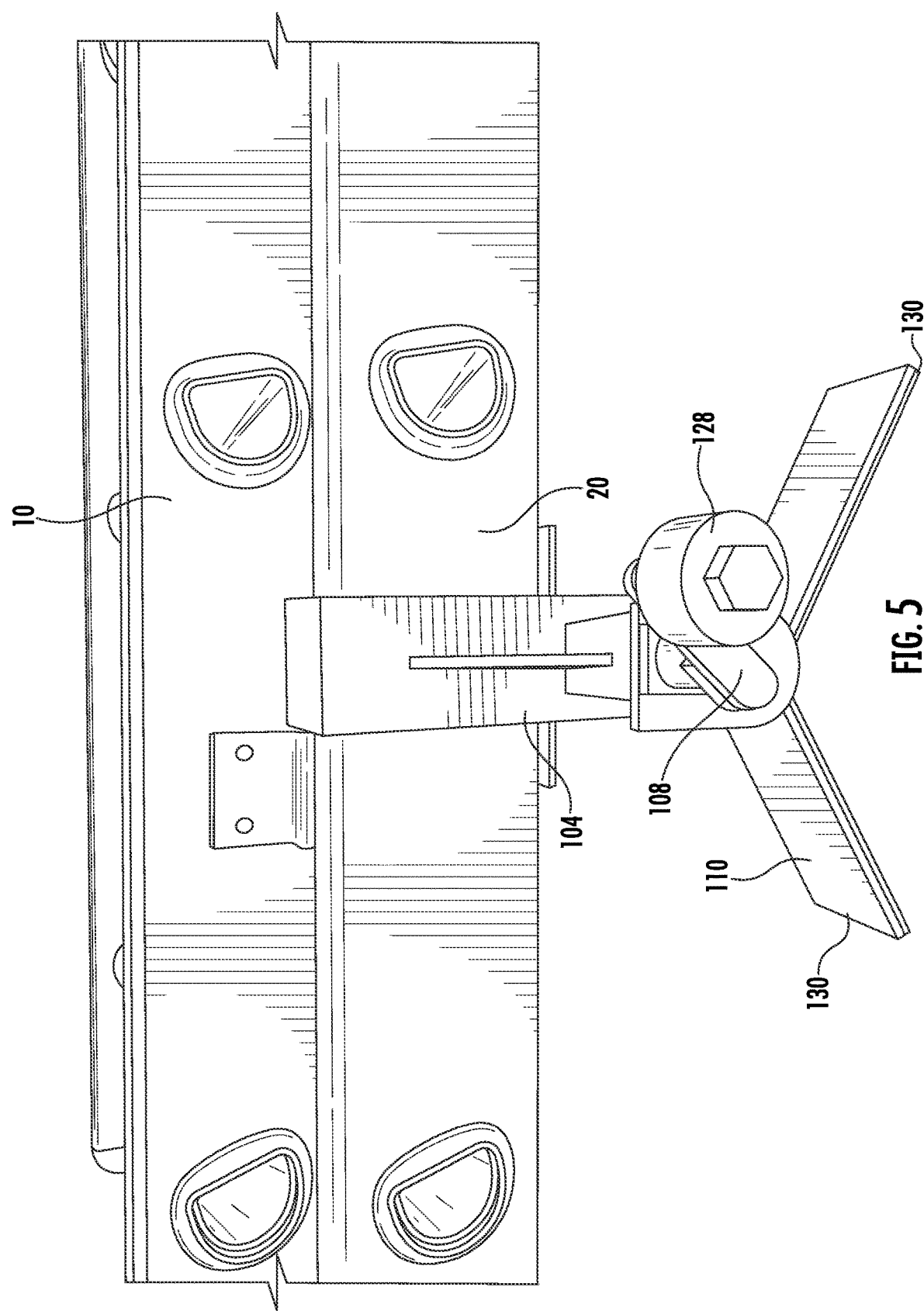
FIG. 5 is a side view of the ladder rack assembly shown in FIG. 1.
Figure 6:
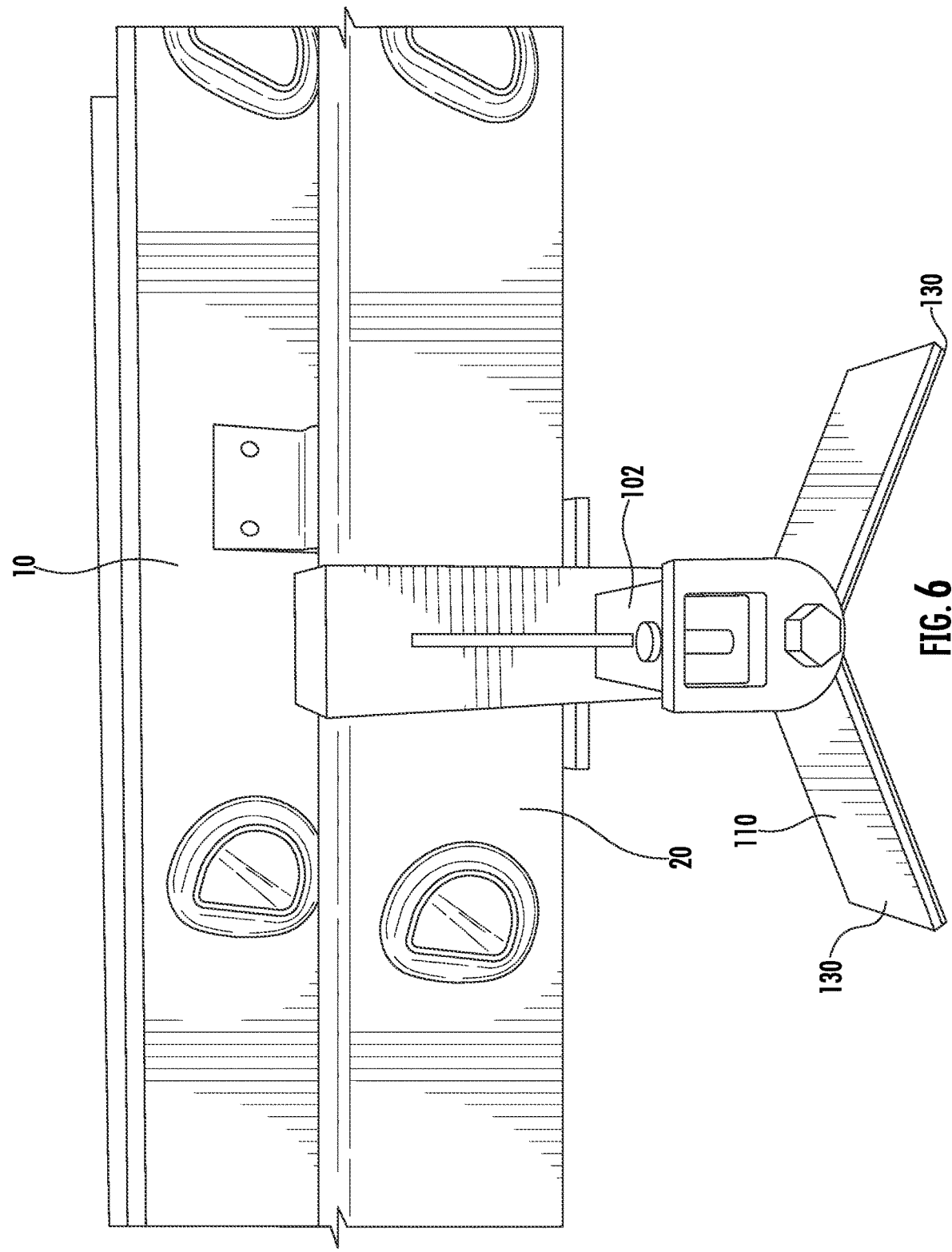
FIG. 6 is another side view of the ladder rack assembly shown in FIG. 1.

A maximum distance between the first bracket 112 and the second bracket 118 may be 21 inches. A minimum distance between the first bracket 112 and the second bracket 118 may be 16.5 inches. The ladder rack assembly 100 may be configured with minimum and maximum distances between the first bracket 112 and the second bracket 118 that are different from those listed above. Because the ladder rack assembly 100 can be adjusted with the first bracket 112 and the second bracket 118 moving back and forth, and each of the first bracket 112 and the second bracket 118 is sized and shaped to fit around a side rail 20 of a ladder 10, together the first rack member 102, the second rack member 104, and the threaded bolt 106 are configured to retain an object, such as a ladder 10, during transport, as shown in FIG. 4.

Figure 7:
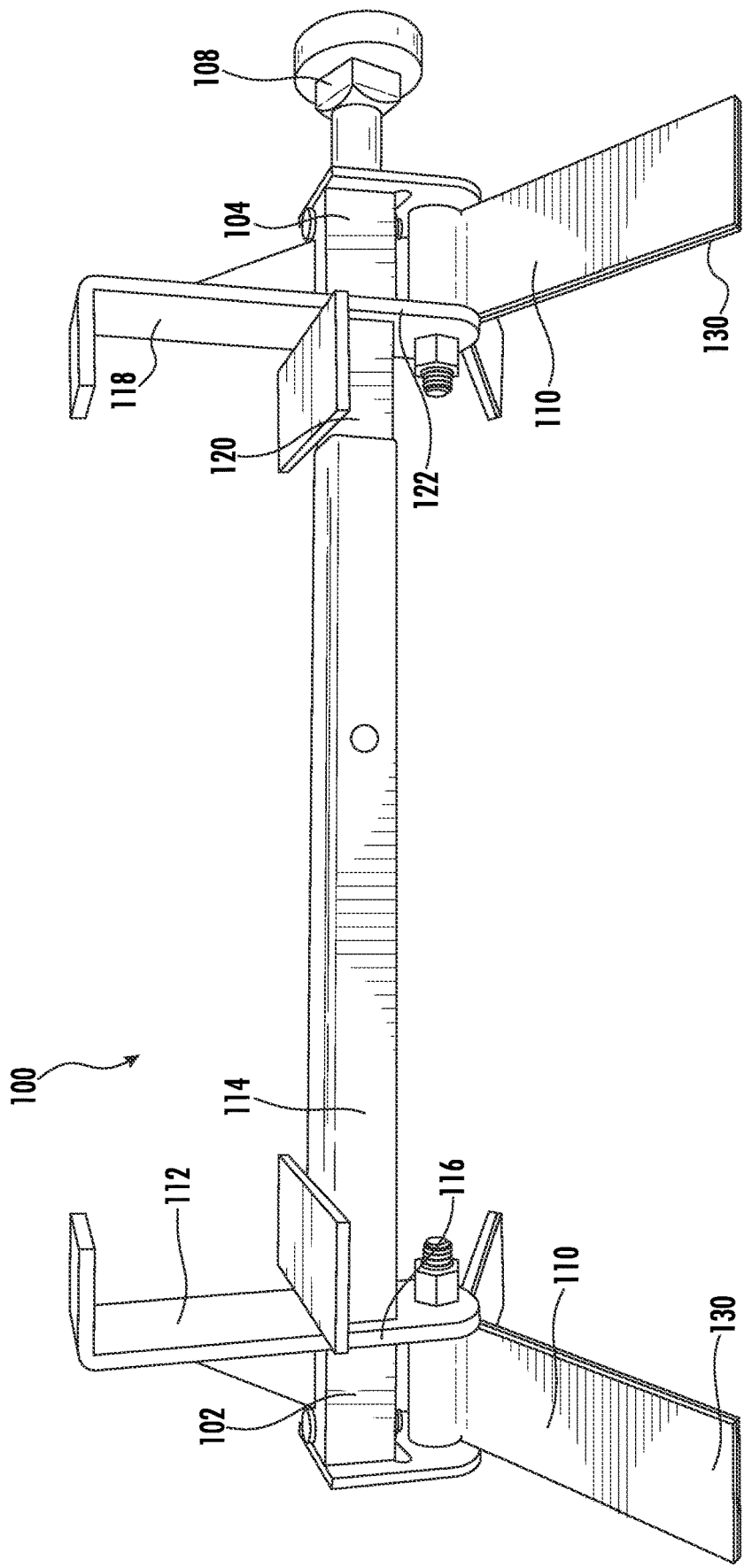
FIG. 7 is a perspective view of a ladder rack assembly with an adjustment lever different from the adjustment lever shown in FIG. 1.

The adjustment lever 108 may be fixedly coupled to the threaded bolt 106. This allows the adjustment lever 108 to be used to activate the threaded bolt 106. For example, the adjustment lever 108 may be configured to rotate the threaded bolt 106 in the clockwise direction and in the counterclockwise direction. The adjustment lever 108 may be an elongated member, as shown in FIGS. 1-3. In such an embodiment, a first end 124 of the adjustment lever 108 is adjacent the threaded bolt 106 and a second end 126 of the adjustment lever 108 is radially distal to the threaded bolt 106. Thus, the user of the ladder rack assembly 100 may adjust the distance between the first bracket 112 and the second bracket 118 by rotating the adjustment lever 108 about the first end 124 of the adjustment lever 108. Because the adjustment lever 108 is coupled to the threaded bolt 106, this also rotates the threaded bolt 106 and thus adjusts the distance between the first bracket 112 and the second bracket 118. The adjustment lever 108 may comprise a knob 128 rotatably coupled to the second end 126 of the adjustment lever 108. The knob 128 may be configured to facilitate rotation of the threaded bolt 106 because the knob 128 is easy to grip and allows the user to rotate the adjustment lever 108 about the first end 124 of the adjustment lever 108 without having to adjust the user's grip. In some embodiments, the adjustment lever 108 may have a center aligned with the threaded bolt 106, as shown in FIG. 7. In such an embodiment, the adjustment lever 108 may rotate to adjust the distance between the first bracket 112 and the second bracket 118 by twisting the adjustment lever 108 about its center.

The at least one rack foot 110 may be coupled to the first rack member 102 or may be coupled to the second rack member 104. The rack foot 110 is configured to support the ladder rack assembly 100 on a truck cab. In some embodiments, the ladder rack assembly 100 may have two rack feet 110, as shown in FIGS. 1-4. Having additional rack feet 110 may help to stabilize the ladder rack assembly 100 when in use. Each of the rack feet 110 may have a rubber base 130 configured to rest on a surface of a vehicle such as a truck cab without damaging the surface of the vehicle. The rubber base 130 may be a layer of rubber bonded to the bottom surface of each of the rack feet 110. The rubber base 130 may be bonded through an adhesive, or through a bonding process. Alternatively, the rubber base 130 may be configured as a sleeve around the rack foot 110. In other embodiments, the rack foot 110 itself may be formed of rubber or some other material that doesn't damage other surfaces. Thus, the rubber base 130 protects the surface of the vehicle.

The ladder rack assembly 100 is described above as having a first bracket 112 and a second bracket 118 that tighten towards each other to secure the ladder 10 or other object within the ladder rack assembly 100. However, in other embodiments, the first bracket 112 and the second bracket 118 may be configured to insert in between the two side rails of a ladder 10. In such an embodiment, the first bracket 118 and the second bracket 120 tighten onto the ladder 10 by moving away from each other and release the ladder 10 by moving towards each other.

As mentioned above, the ladder rack assembly 100 allows the ladder 10 to be secured to a truck without requiring that the ladder 10 make contact with the truck cab or extend out of the truck bed over the road. In addition, the ladder rack assembly 100 decreases the likelihood that the ladder 10 will slide side-to-side during transport because the ladder rack assembly 100 helps to grip the vehicle. This improves the safety of transporting long objects in truck beds such as a ladder without causing damage to the vehicle. To decrease the overall weight of the ladder rack assembly 100, in some embodiments, the components of the ladder rack assembly 100 are all formed of aluminum. In other embodiments, most of the components of the ladder rack assembly 100 may be formed of aluminum while components that may be exposed to more wear, such as the threaded bolt 106, the nut 107, and the adjustment lever 108 may be formed of steel.

It will be understood that implementations of a ladder rack assembly are not limited to the specific assemblies, devices and components disclosed in this document, as virtually any assemblies, devices and components consistent with the intended operation of a ladder rack assembly may be used. Accordingly, for example, although particular ladder rack assemblies, and other assemblies, devices and components are disclosed, such may include any shape, size, style, type, model, version, class, measurement, concentration, material, weight, quantity, and/or the like consistent with the intended operation of ladder rack assemblies. Implementations are not limited to uses of any specific assemblies, devices and components; provided that the assemblies, devices and components selected are consistent with the intended operation of a ladder rack assembly.

Accordingly, the components defining any ladder rack assembly may be formed of any of many different types of materials or combinations thereof that can readily be formed into shaped objects provided that the materials selected are consistent with the intended operation of a ladder rack assembly. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various ladder rack assemblies may be manufactured using conventional procedures as added to and improved upon through the procedures described here. Some components defining a ladder rack assembly may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling ladder rack assemblies are not limited to the specific order of steps as disclosed in this document. Any steps or sequence of steps of the assembly of a ladder rack assembly indicated herein are given as examples of possible steps or sequence of steps and not as limitations, since various assembly processes and sequences of steps may be used to assemble ladder rack assemblies.

The implementations of a ladder rack assembly described are by way of example or explanation and not by way of limitation. Rather, any description relating to the foregoing is for the exemplary purposes of this disclosure, and implementations may also be used with similar results for a variety of other applications employing a ladder rack assembly.

What is claimed is:
1. A ladder rack assembly, comprising:
 a first rack member having a first bracket and a first crossbar coupled to a bottom of the first bracket, wherein the first bracket is C-shaped and opens in a first direction and the first crossbar extends away from the first bracket in the first direction;

a second rack member having a second bracket and a second crossbar coupled to a bottom of the second bracket, wherein the second bracket is C-shaped and opens in a second direction opposite the first direction, the second crossbar extends away from the second bracket in the second direction, and the second crossbar is telescopically coupled with the first crossbar;

a threaded bolt extending through the first crossbar and the second crossbar and threadedly coupled to a nut slidably coupled with the first crossbar;

an adjustment lever fixedly coupled to the threaded bolt and configured to rotate the threaded bolt in a clockwise direction and a counterclockwise direction opposite the clockwise direction, wherein when the threaded bolt is rotated in the clockwise direction, the nut moves along the threaded bolt toward the adjustment lever until contacting a stop fixedly coupled to the first crossbar and when the threaded bolt is rotated in the counterclockwise direction, the nut moves along the threaded bolt away from the adjustment lever; and at least one rack foot hingedly coupled to one of the first rack member and the second rack member, the at least one rack foot having a rubber base configured to rest on a surface of a vehicle without damaging the surface of the vehicle;

wherein the first rack member, the second rack member, and the threaded bolt together are configured to retain an object during transport.

2. The ladder rack assembly of claim 1, further comprising a knob rotatably coupled to the adjustment lever, wherein the knob is configured to facilitate rotation of the threaded bolt.

3. The ladder rack assembly of claim 1, wherein each of the first bracket and the second bracket is sized and shaped to fit around a side rail of a ladder.

4. The ladder rack assembly of claim 1, wherein a maximum distance between the first bracket and the second bracket is 21 inches.

5. The ladder rack assembly of claim 1, wherein a minimum distance between the first bracket and the second bracket is 16.5 inches.

* * * * *